United States Patent
Li et al.

(10) Patent No.: US 9,279,995 B2
(45) Date of Patent: Mar. 8, 2016

(54) 3D DISPLAY DEVICE AND 3D DISPLAY SYSTEM

(71) Applicant: BOE Technology Group Co., Ltd., Beijing (CN)

(72) Inventors: Wenbo Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 71 days.

(21) Appl. No.: 14/041,118

(22) Filed: Sep. 30, 2013

(65) Prior Publication Data

US 2014/0092331 A1   Apr. 3, 2014

(30) Foreign Application Priority Data

Sep. 28, 2012   (CN) .......................... 2012 1 0371665

(51) Int. Cl.
*G02F 1/1335* (2006.01)
*G02B 27/26* (2006.01)
*G02B 27/24* (2006.01)

(52) U.S. Cl.
CPC ................ *G02B 27/26* (2013.01); *G02B 27/24* (2013.01)

(58) Field of Classification Search
CPC ............................. G02B 27/26; G02B 27/2214
USPC ........................................................ 349/15
See application file for complete search history.

(56) References Cited

U.S. PATENT DOCUMENTS

| 2005/0024563 | A1 | 2/2005 | Jang et al. |
| 2009/0251625 | A1 | 10/2009 | Kwon et al. |
| 2012/0134019 | A1* | 5/2012 | Wu ............................... 359/463 |
| 2013/0010359 | A1* | 1/2013 | Do et al. ....................... 359/465 |

FOREIGN PATENT DOCUMENTS

| CN | 1470906 A | 1/2004 |
| CN | 1601349 A | 3/2005 |
| CN | 101359099 A | 2/2009 |
| CN | 101556410 A | 10/2009 |
| CN | 201765385 A | 3/2011 |
| CN | 102087419 A | 6/2011 |

OTHER PUBLICATIONS

Second Examination Report issued by the State Intellectual Property Office ("SIPO") on Dec. 16, 2015 for International Application No. 201210371665.4, 6 pages.

(Continued)

*Primary Examiner* — Thanh-Nhan P Nguyen
(74) *Attorney, Agent, or Firm* — Ladas & Parry LLP

(57) ABSTRACT

Embodiments of the present invention provide a 3D display device and a 3D display system, the 3D display device, comprising: a reflecting unit, reflecting light incident thereon; a polarization display unit, formed at a reflected light emitting side of the reflecting unit, and the polarization display unit for displaying images, converting incident natural light into polarized light and transmitting or blocking light reflected by the reflecting unit; and a polarization direction adjustment unit, formed at a reflected light emitting side of the polarization display unit, for converting the reflected light emitted from the polarization display unit into two sets of polarized light with different polarization directions.

20 Claims, 7 Drawing Sheets

(56) References Cited

OTHER PUBLICATIONS

English translation of second Examination Report issued by SIPO for International Application No. 201210371665.4, 6 pages.
First Office Action for Chinese Patent Application 201210371665.4 dated May 20, 2014, 8pgs.
English translation of First Office Action for Chinese Patent Application 201210371665.4 dated May 20, 2014, 7pgs.
Third Chinese Office Action dated Apr. 22, 2015; Appln. No. 201210371665.4.
Fourth Chinese Office Action Appln. No. 201210371665.4; Dated Aug. 21, 2015.

* cited by examiner

3D DISPLAY DEVICE AND 3D DISPLAY SYSTEM

CROSS REFERENCE TO RELATED APPLICATIONS

This application claims priority from Chinese National Application No. 201210371665.4 filed on Sep. 28, 2012, the contents of which are incorporated herein by reference.

TECHNICAL FIELD

Embodiments of the present invention relate to a 3D display device and a 3D display system.

BACKGROUND

The stereoscopic display has become a trend in the display field. A fundamental principle for the stereoscopic display lies in: the stereovision vision is resulted from the parallax, i.e. a left eye of a viewer only sees a left eye image and a right eye only sees a right eye image, wherein the left eye image and the right eye image are a pair of stereoscopic images with parallax.

One method to achieve the stereoscopic display is a time serial manner, in which at a first time slot, a display device displays a image for the left eye, when only the left eye of a viewer can see this left-eye image, and at a second time slot, the display device displays a image for the right eye, when only the right eye of a viewer can see this right-eye image, and thus, due to the visual persistence of the viewer's eyes, the viewer feels that the left and right eye pictures are seen at the same time, and a stereovision can be generated generates.

Another method to achieve the stereoscopic display is a parallel manner, in which at the same time a display device displays a image for the left eye and a image for the right eye alternately in different regions, and preferably, the images are displayed precisely in pixel level, and thus, by using a parallax barrier or a polarized glasses, the right eye and the left eye of a viewer can respectively see the image for the right eye and the image for the left eye so as to achieve the stereoscopic display.

Polarized glasses type stereoscopic display is a mainstream technology in present stereoscopic display field, the basic structure of this technology is to dispose a device which can regulate polarization direction of emitted light at a light emitting side of a display panel. This device may be a phase retarder plate, or a liquid crystal cell, or other any device which can regulate polarization direction of emitted light from different pixels. As shown in FIG. 1, there are from top to bottom: a display panel, a phase retarder plate, an emitted picture and a polarized glasses for viewing. On the display panel, one row is for displaying the right eye picture, and directly adjacent one row is for displaying the left eye picture. The phase retarder plate is disposed in front of the display panel, and one row thereof has a phase delay of $\lambda/2$, directly adjacent one row thereof has a phase delay of 0, in which $\lambda$ is a light wavelength. Thus, light emitting from pixels corresponding to rows of the phase retarder plate having a phase delay of $\lambda/2$ is rotated by 90°. In this way, wearing a polarized glasses with orthogonal left and right eyeglass polarization directions allows the right eye to see only light emitted from right eye pixels, and left eye to see only light emitted from left eye pixels, thereby producing a stereovision. Alternatively, the phase retarder plate has one row of $\lambda/4$ phase delay and directly adjacent one row of $-\lambda/4$ phase delay, generating left-handed and right-handed circularly polarized light. Wearing a circularly polarized light glasses can produce a stereovision (not shown).

There is also another mode in which a liquid crystal cell and a $\lambda/4$ wave plate are disposed on the light-emitting side of the display panel. The liquid crystal cell is used to temporally or spatially form two sets of polarized light with different polarization directions and the two sets of polarized light are converted into left-handed and right-handed circular polarization after transmitting through the $-\lambda/4$ wave plate, thereby left and right eye images are distinguished from each other, and realizing full resolution or half resolution polarized light 3D display.

However, the above-mentioned various structures are only suitable to the transmissive 3D display at present, and as for the transmissive 3D display, a backlight source and a polarizer are needed to dispose under the display panel, thus leading to a complex structure and the high cost.

SUMMARY

Embodiments of the present invention provide a reflective 3D display device and a 3D display system with a simple structure and a relatively lower cost.

In one aspect, an embodiment of the present invention provides a 3D display device, comprising: a reflecting unit, reflecting light incident thereon; a polarization display unit, formed at a reflected light emitting side of the reflecting unit, and the polarization display unit for displaying images, converting incident natural light into polarized light and transmitting or blocking light reflected by the reflecting unit; and a polarization direction adjustment unit, formed at a reflected light emitting side of the polarization display unit, for converting the reflected light emitted from the polarization display unit into two sets of polarized light with different polarization directions.

In another aspect, an embodiment of the present invention further provides a 3D display system, comprising: a 3D display device as mentioned above; and a 3D polarized glasses, used together with the 3D display device.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
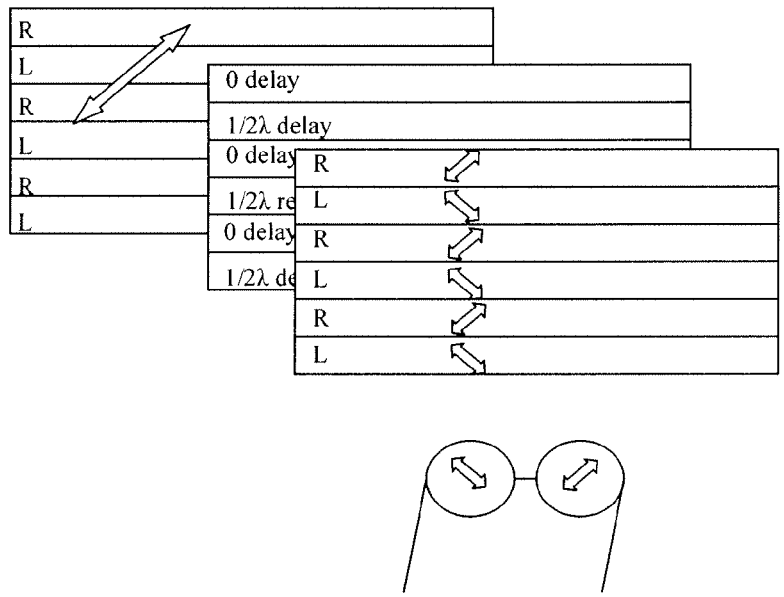
FIG. 1 is a schematic view showing a principle of a current 3D display technology.
Figure 2:
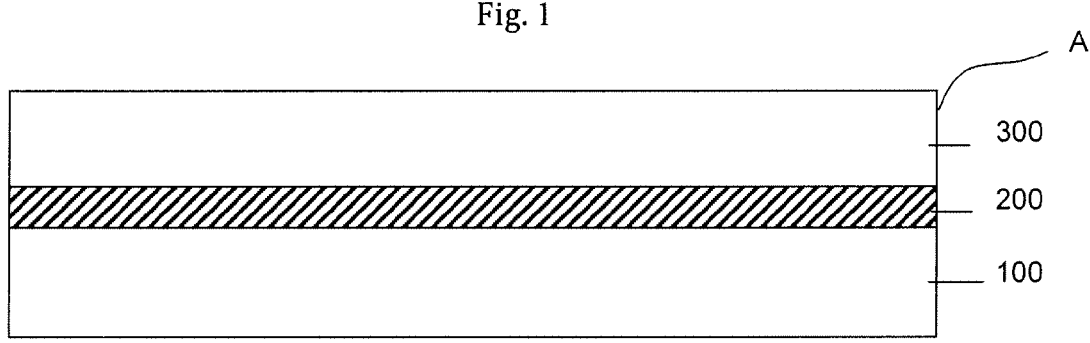
FIG. 2 is a schematic cross-sectional structural view of a 3D display device according to an embodiment of the present invention.

Referring to FIG. 2, embodiments of the present invention provide a 3D display device A, comprising: a reflecting unit 100, reflecting light incident thereon; a polarization display unit 200, formed at a reflected light emitting side of the reflecting unit, and the polarization display unit for displaying images, converting incident natural light into polarized light and transmitting or blocking light reflected by the reflecting unit 100; and a polarization direction adjustment unit 300, formed at a reflected light emitting side of the polarization display unit 200, for converting the reflected light emitted from the polarization display unit 200 into two sets of polarized light with different polarization directions.

With the 3D display device provided in embodiments of the present invention, without a backlight source, the 3D display effect can be realized under the ambient light, and therefore, the 3D display device has a simple structure, a reduced cost, and can facilitate development of the 3D display technology.

It is noted that, a term "incident light" described in embodiments of the present invention refers to ambient light entering the 3D display device from a display surface side thereof, i.e., from a side where the polarization direction adjustment unit is disposed, and the ambient light is referred to as "incident light" until being reflected by the reflecting unit. A term "reflected light" described in embodiments of the present invention refers to the ambient light reflected by the reflecting unit.

Alternatively, an embodiment of the present invention further provides a 3D display system, comprising: the above mentioned 3D display device and a polarized glasses. The polarized glasses may be a linearly polarized light glasses or a circularly polarized light glasses. The two sets of polarized light with different polarization directions emitted from the polarization direction adjustment unit of the 3D display device enter a left eyeglass and a right eyeglass, respectively.

Figure 3:
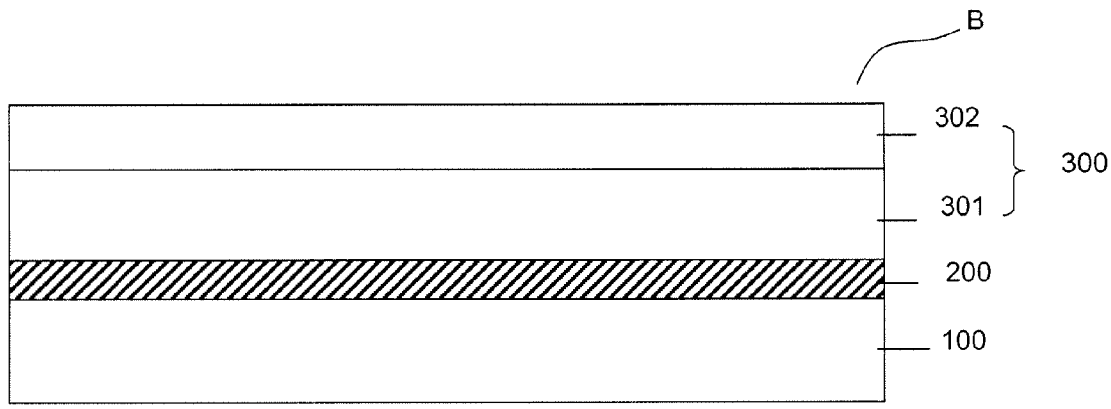
FIG. 3 is a schematic cross-sectional structural view of another 3D display device according to an embodiment of the present invention.

Exemplarily, FIG. 3 shows a schematic cross-sectional view of a 3D display device. The polarized glasses used together with the 3D display device B shown in FIG. 3 is a circularly polarized light glasses. As shown in FIG. 3, the polarization direction adjustment unit 300 included in the 3D display device B comprises: a liquid crystal cell 301, for converting the polarized light reflected from the reflecting unit 100 and transmitted through the polarization display unit 200 into two sets of polarized light with different polarization directions alternating temporally or spatially, wherein the two sets of polarized light have mutually perpendicular polarization directions; a λ/4 wave plate 302, formed at a reflected light emitting side of the liquid crystal cell, converting the two sets of polarized light with orthogonal polarization directions into left-handed and right-handed circularly polarized light, which will enter the left eyeglass and the right eyeglass of the polarized glasses, respectively.

Figure 4:
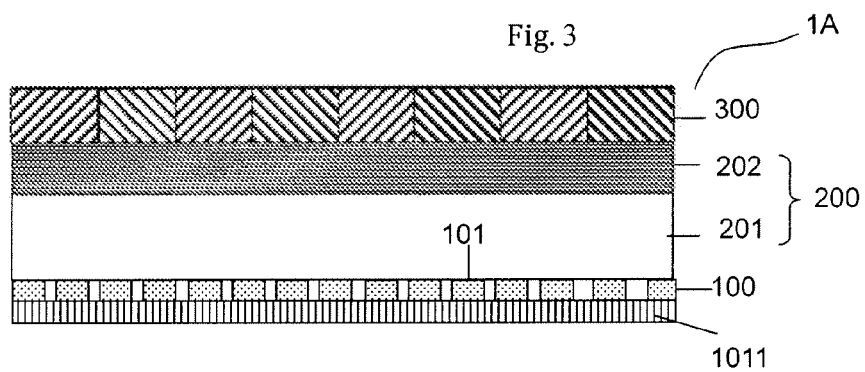
FIG. 4 is a schematic cross-sectional structural view of a 3D display device according to a first embodiment of the present invention.

Exemplarily, FIG. 4 shows a schematic cross-sectional view of a 3D display device according to a first embodiment of the present invention. As shown in FIG. 4, the polarization direction adjustment unit included in the 3D display device 1A is a phase retarder plate 300, wherein the phase retarder plate 300 comprises a plurality of strip-shaped regions having equal width arranged horizontally or vertically, and every two strip-shaped regions have a λ/2 difference in a phase delay.

Exemplarily, in case that the polarized glasses used together with the 3D display device 1A shown in FIG. 4 is a circularly polarized light glasses, one strip-shaped region of any two strip-shaped regions disposed adjacently of the phase retarder plate 300 has a phase delay of λ/4, the other has a phase delay of −λ/4. Alternatively, in case that the polarized glasses used together with the 3D display device shown in FIG. 4 is a linearly polarized light glasses, one strip-shaped region of any two strip-shaped regions disposed adjacently of the phase retarder plate 300 has a phase delay of λ/2, the other has a phase delay of 0.

The technical solution according to an embodiment of the present invention will be explanation in detail below with reference to drawings and specific embodiments.

A First Embodiment

FIG. 4 shows a schematic cross-sectional view of a 3D display device according to a first embodiment of the present invention. As shown in FIG. 4, the 3D display device 1A comprises: a reflecting unit 100, reflecting light incident thereon; a polarization display unit 200, formed at a reflected light emitting side of the reflecting unit 100, and the polarization display unit for displaying images, converting incident natural light into polarized light and transmitting or blocking light reflected by the reflecting unit 100; and a polarization direction adjustment unit 300, formed at a reflected light emitting side of the polarization display unit 200, for converting the reflected light emitted from the polarization display unit 200 into two sets of polarized light with different polarization directions, wherein the polarization display unit 200 comprises: a polarizer 202, disposed at a reflected light incidence side of the polarization direction adjustment unit 300; a display panel 201, disposed at a reflected light incidence side of the polarizer 202, and for displaying images and rotating polarization directions of linearly polarized light incident thereon through the polarizer 202 and linearly polarized light reflected from the reflecting unit by a predetermined angle, such as 90°.

In the 3D display device 1A according to the embodiment of the present invention, the polarizer 202 formed at a reflected light emitting side of the display panel 201 is configured to convert incident natural light into linearly polarized light. Particularly, the polarizer 202 absorbs polarized light with one polarization direction and transmits polarized light with polarization direction perpendicular to the one polarization direction, that is, the polarizer absorbs polarized light with polarization direction perpendicular to that of the linearly polarized light converted by it.

Exemplarily, in the 3D display device 1A according to the embodiment of the present invention, the polarization direction adjustment unit 300 may be a phase retarder plate including a plurality of strip-shaped regions with equal width arranged horizontally or vertically, wherein every two adjacent strip-shaped regions have a phase delay difference of $\lambda/2$. For example, a phase delay of one of the two adjacent strip-shaped regions is $\lambda/4$ or $\lambda/2$, a phase delay of the other is $-\lambda/4$ or 0.

Exemplarily, as shown in FIG. 4, in the 3D device 1A according to the embodiment of the present invention, the reflecting unit 100 is a selective reflecting unit, and the selective reflecting unit 100 comprises: a substrate 1011; and a plurality of metal strips 101, being parallel to each other and formed on the substrate 1011. And the selective reflecting unit reflects only polarized light with one polarization direction.

Alternatively, the selective reflecting unit 100 may be integrated into the display panel 201, and formed on a substrate on which elements of the display panel 201 are disposed, and thus, the metal strips may need to be covered with a planarization layer so as to form the elements of the display panel 201.

Further, the selective reflecting unit 100 may reflect polarized light having polarization direction along a extending direction of the metal strip 101 while transmit polarized light having polarization direction perpendicular to the extending direction of the metal strip, thereby realizing selective reflection of the polarized light.

Exemplarily, in this embodiment, the extending direction of the metal strip 101 may be perpendicular to or parallel to a transmission axis direction of the polarizer 202, that is, the metal strip 101 may reflect the polarized light transmitted through the polarizer 202 or reflect polarized light with polarization direction perpendicular to the polarized light transmitted through the polarizer 202.

Exemplarily, the metal strip 101 may be fabricated by using a nanometer-level wire grid polarizer (WLP, metal grating polarizer or wire grid polarizer) technology, and dimension characteristics the metal strip, such as a width, a height, may be conventional in the art, so long as they can selectively reflect light incidence thereon.

Figure 5:
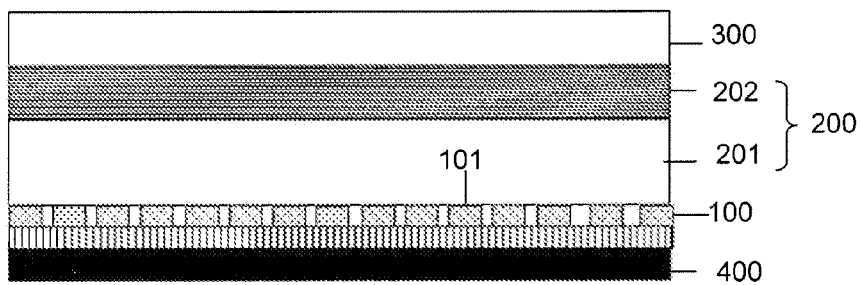
FIG. 5 is a schematic cross-sectional structural view of another 3D display device according to the first embodiment of the present invention.

Alternatively, as shown in FIG. 5, the 3D display device 1A according to the embodiment of the present invention may further include a light absorbing unit 400 disposed under the selective reflecting unit 100.

Exemplarily, the light absorbing unit 400 is a common element capable of absorbing light, and embodiments of the present invention is limited to this.

Exemplarily, the display panel 201 may be a liquid crystal display panel, and may be a TN type, a VA type, an IPS type or a FFS type liquid crystal display panel, wherein the liquid crystal display panel 201 comprises: an array substrate and an counter substrate, cell-assembled to each other to form a liquid crystal cell; liquid crystal material, filled in the liquid crystal cell, wherein the array substrate includes a plurality of gate lines and a plurality of data lines, these gate lines and data lines intersect each other to define pixel units arranged in a matrix, each pixel unit includes a thin film transistor as a switching element and pixel electrode and common electrode for controlling liquid crystal alignment, the pixel electrode is formed on the array substrate while the common electrode is formed on the counter substrate or the array substrate.

A operating process and a principle of the 3D display device according to the embodiment of the present invention will be explained by taking a TN type display panel 201 as an example.

Figure 9:
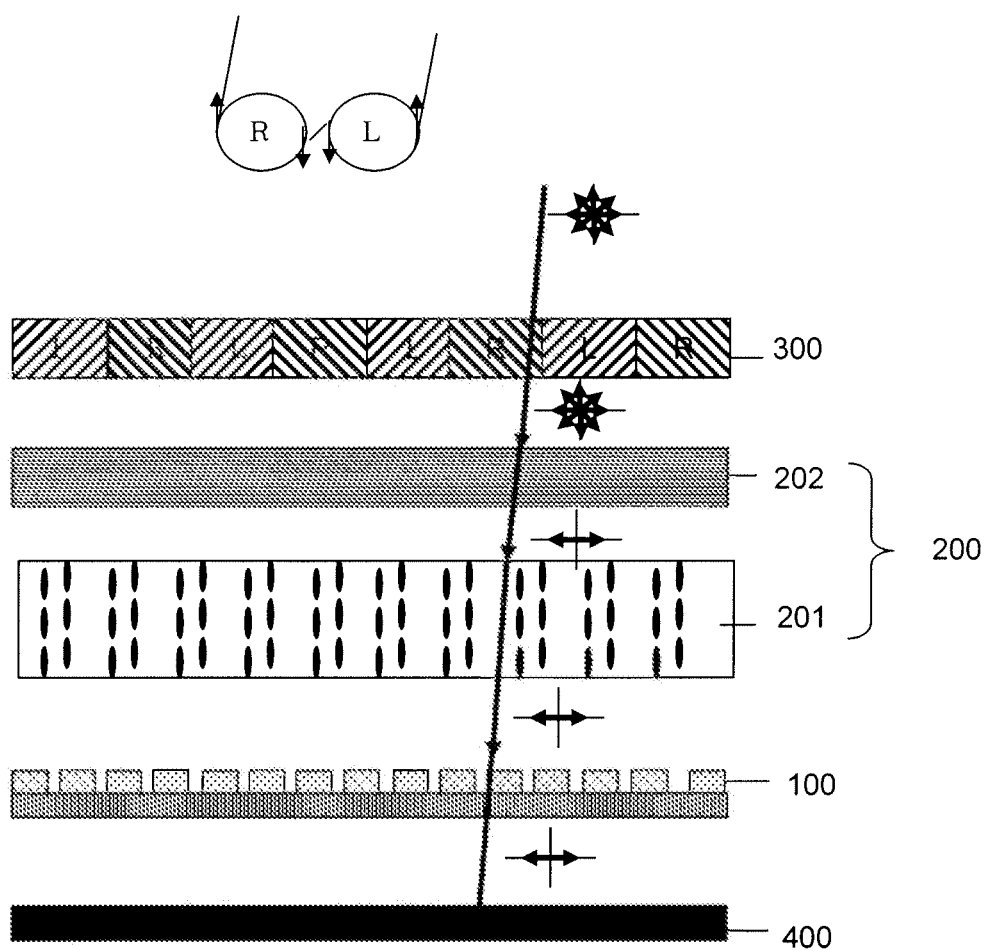
FIGS. 9 and 10 are operating principle views of the 3D display device according to the first embodiment of the present invention under dark and bright states, respectively.
Figure 10:
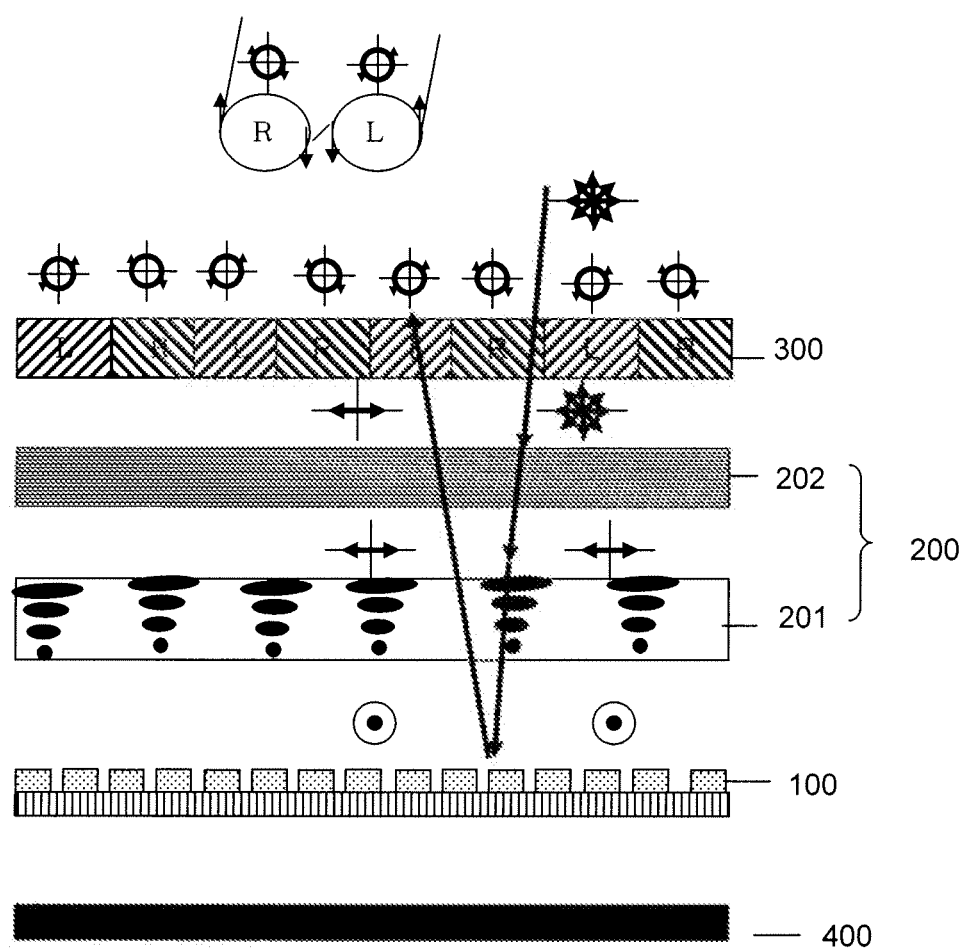

FIGS. 9 and 10 shows operating principle views of the 3D display device shown in FIG. 4 according to an embodiment of the present invention under dark and bright states, respectively, wherein the extending direction of the metal strip 101 is perpendicular to the transmission axis direction of the polarizer 202.

When the 3D display device 1A is in the dark state, as shown in FIG. 9, natural light (denoted by a asterisk) is converted into linearly polarized light (denoted by a double arrow "⇔") after transmitting through the phase retarder plate 300 and the polarizer 202, after passing through the display panel 201, the light does not change its polarization direction, then the light emitted from the display panel 201 has the polarization direction perpendicular to the extending direction of the metal strip of the selective reflecting unit 100. Thus, as shown in FIG. 9, the light is transmitted through the selective reflecting unit 100 rather than being reflected, and then absorbed by the absorbing unit 400, thereby the entire 3D display device 1A is in the dark state.

When the 3D display device 1A is in the bright state, as shown in FIG. 10, when passing through the display panel 201, a polarization direction of the polarized light (denoted by double arrow "⇔") transmitted through the phase retarder plate 300 and the polarizer 202 is changed by 90° so as to be parallel to the extending direction (denoted by a point circle) of the metal strip of the selective reflecting unit 100, then the light is reflected by the selective reflecting unit 100, and is restored to the original polarization direction after passing through the display panel 201 (denoted by double arrow "⇔"), thus may be transmitted through the polarizer 202 and then passes the phase retarder plate 300 (with a $\lambda/4$ delay and a $-\lambda/4$ delay as a example), and thus, the reflected light is formed into a left-handed circularly polarized light (denoted by an anti-clockwise circle) and a right-handed circularly polarized light (denoted by a clockwise circle), and after transmitted through a circularly polarized light 3D glasses, the light with different polarization states are seen by the right eye and the left eye, respectively, and thus, a 3D display is achieved.

It is noted that, FIGS. 9 and 10 shows a case in which two adjacent regions of the phase retarder plate 300 have a $\lambda/4$ delay and a $-\lambda/4$ delay, respectively, however, the phase retarder plate 300 in which two adjacent regions respectively have a $\lambda/2$ delay and a 0 delay can also be applicable for an embodiment of the present invention, and the latter case will not be explanation in detail. Furthermore, FIGS. 9 and 10 show that the transmission axis direction of the polarizer 202 is parallel to the paper surface, however, an embodiment of the present invention is not limited thereto, the transmission axis direction of the polarizer 202 may also be perpendicular to the paper surface.

Exemplarily, as for a case in that the extending direction of the metal strip 101 is parallel to the transmission axis direction of the polarizer 202, a operating principle of the the 3D display device 1A shown in FIG. 4 is explained as the following, and specific views are not given here for the sake of simplicity.

When the 3D display device 1A is in the dark state, natural light is converted into linearly polarized light after transmitting through the phase retarder plate 300 and the polarizer 202, the polarization direction of the linearly polarized light after passing the display panel 201 is changed by 90°, then the light emitted from the display panel 201 has a polarization direction perpendicular to the extending direction of the metal strip of the selective reflecting unit 100. Thus, the light is transmitted through the selective reflecting unit 100 rather than being reflected, and then absorbed by the absorbing unit 400, thereby the entire 3D display device 1A appears the dark state.

When the 3D display device 1A is in the bright state, the polarization direction of the polarized light after passing the display panel 201 is not changed, so as to be parallel to the extending direction of the metal strip of the selective reflecting unit 100, and thus, the light is reflected by the selective reflecting unit 100 and transmitted through the display panel 201 as it is, therefore it can be transmitted through the polarizer 202. Then, the reflected light is converted into a left-handed circularly polarized light and a right-handed circularly polarized light or two linearly polarized lights orthogonal to each other after being transmitted through the phase retarder plate 300, and after transmitted through a circularly or linearly polarized light 3D glasses, the light with different polarization states are seen by the right eye and the left eye, respectively, and thus, a 3D display is achieved.

It should be noted that as for the VA type, the IPS type or the FFS type liquid crystal display panel, the difference only lies in: operating states of the 3D display device when being powered on or powered off and a structure of the display panel as compared with the TN type display panel, and thus, for brevity, the corresponding explanation is omitted.

A Second Embodiment

Figure 6:
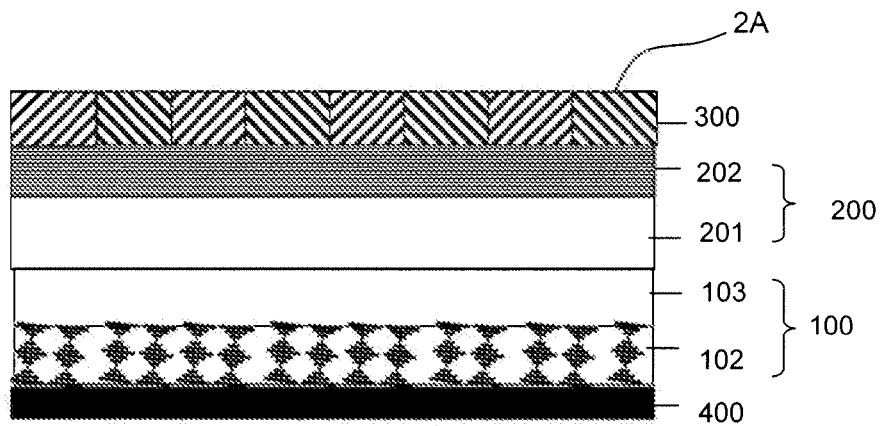
FIG. 6 is a schematic cross-sectional structural view of a 3D display device according to a second embodiment of the present invention.

FIG. 6 shows a 3D display device 2A according to a second embodiment of the present invention, which differs from the 3D display device 1A according to the first embodiment of the present invention only in that, the reflecting unit 100 has a different structure, and other components and their structures are basically the same as those of the 3D display device 1A.

Hereinafter, the structure of the reflecting unit 100 of the 3D display device 2A according to the second embodiment of the present invention will be described in detail. As shown in FIG. 6, the reflecting unit 100 comprises: a cholesterol liquid crystal layer 102 with planar texture, for reflecting only a left-handed or right-handed circularly polarized light; a λ/4 wave plate 103, formed on a reflected light emitting side of the cholesterol liquid crystal layer 102, and for converting the left-handed or right-handed circularly polarized light reflected from the cholesterol liquid crystal layer 102 into linearly polarized light, and converting linearly polarized light emitted from the display panel 201 into circularly polarized light.

By taking a case in that liquid crystal in the cholesterol liquid crystal layer is left-handed liquid crystal as an example, the planar texture may be realized by adding left-handed chiral compound and nematic liquid crystal, and incident light may be performed partial Bragg reflection, in which reflected light is left-handed circularly polarized light while transmitted light is right-handed circularly polarized light, hence realizing selective reflection.

The λ/4 wave plate 103 cooperates with the cholesterol liquid crystal layer 102 in order to convert circularly polarized light reflected by the cholesterol liquid crystal layer 102 back into linearly polarized light, wherein the cholesterol liquid crystal layer 102 selectively reflects the left-handed or right-handed circularly polarized light s and transmits light having opposite rotation direction according to design requirement.

The operating principle of the 3D display device 2A according to the embodiment is basically the same as that of the 3D display device 1A according to the first embodiment, which will not be detailed here.

A Third Embodiment

Figure 7:
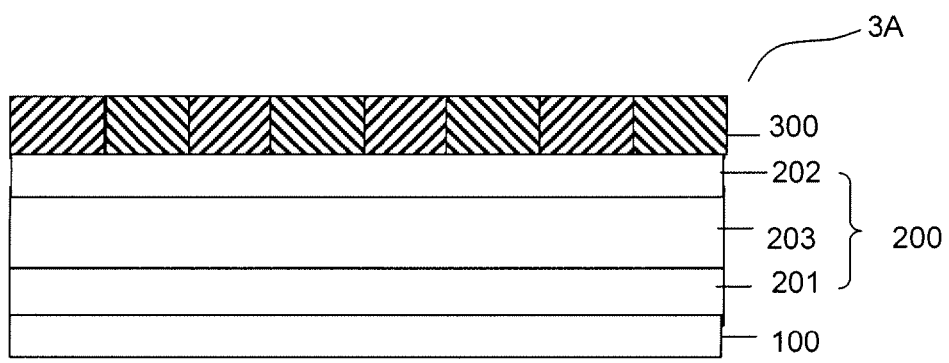
FIG. 7 is a schematic cross-sectional structural view of a 3D display device according to a third embodiment of the present invention.

FIG. 7 shows a 3D display device 3A according to a third embodiment of the present invention, and a different between the 3D display device 3A and the 3D display device 1A according to the first embodiment of the present invention is only in the polarization display unit 200 and the reflecting unit 100, and other components and structures thereof are basically the same as the 3D display device 1A.

Hereinafter, the structure of the polarization display unit 200 and the reflecting unit 100 of the 3D display device 3A according to the third embodiment of the present invention will be described in detail.

As shown in FIG. 7, the polarization display unit 200 comprises: a display panel 201, for displaying images; a λ/4 wave plate 203, formed at a reflected light emitting side of the display panel 201, for converting incident linearly polarized light into circularly polarized light and converting reflected circularly polarized light into linearly polarized light; and a polarizer 202, formed on a reflected light emitting side of the λ/4 wave plate 203, and for converting incident natural light into linearly polarized light.

In the 3D display device 3A according to the third embodiment of the present invention, the reflecting unit 100 located at a reflected light incidence side of the display panel 201 is a total reflection unit for totally reflecting incident light. The total reflection unit may adopt conventional structure and material in the art, and the present invention has no limitation on them.

Exemplarily, when rotating incoming light, the display panel 201 can convert linearly polarized light into circularly polarized light or convert circularly polarized light into linearly polarized light.

More specifically, in the embodiment, when the 3D display device 3A is in the bright state, the display panel 201 converts incident circularly polarized light into linearly polarized light and converts the linearly polarized light reflected by the reflecting unit into circularly polarized light; when the 3D display device 3A is in the dark state, the display panel 201 will not change polarization state of the incident circularly polarized light and polarization state of the linearly polarized light reflected by the reflecting unit.

Figure 11:
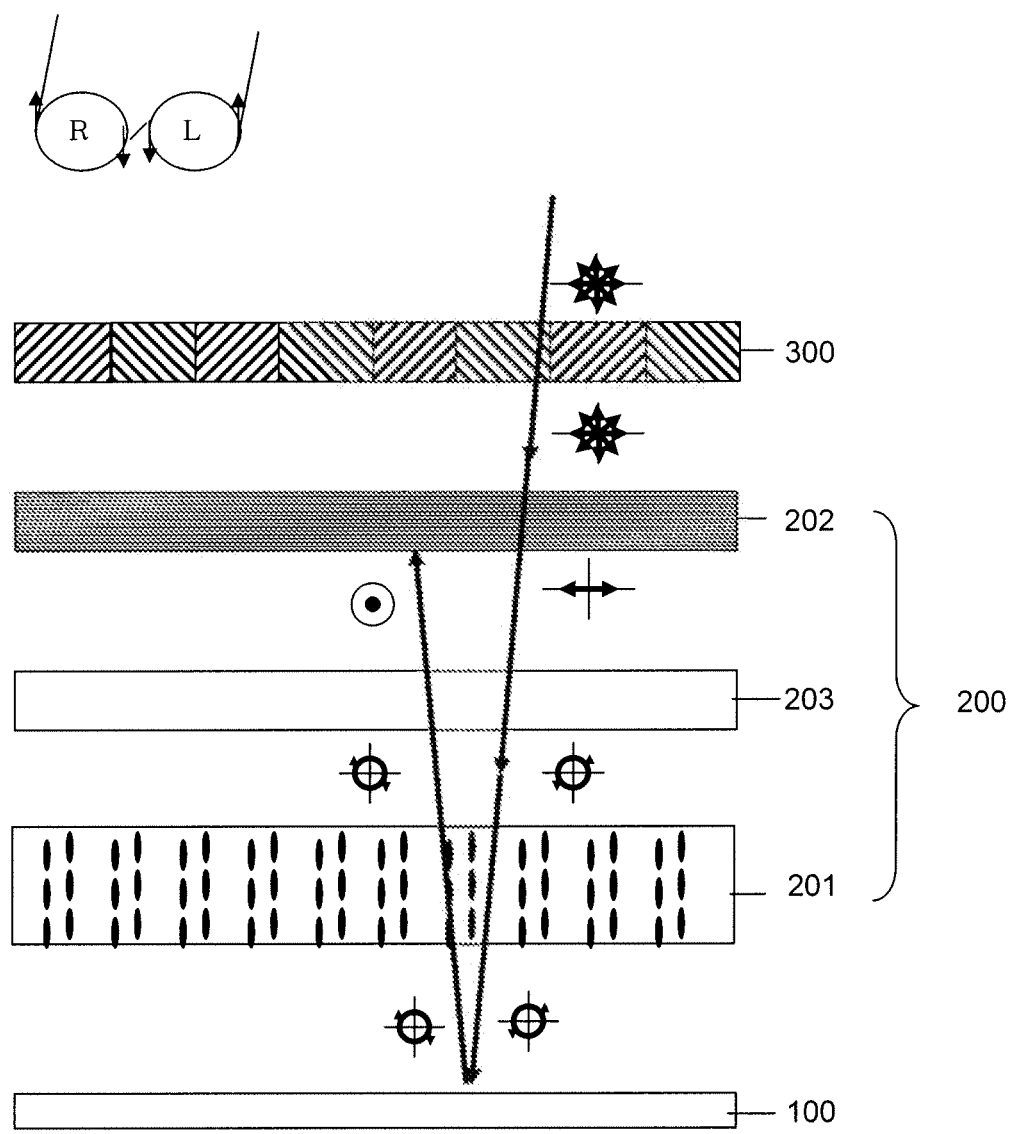
FIGS. 11 and 12 are operating principle views of the 3D display device according to the third embodiment of the present invention under dark and bright states, respectively.
Figure 12:
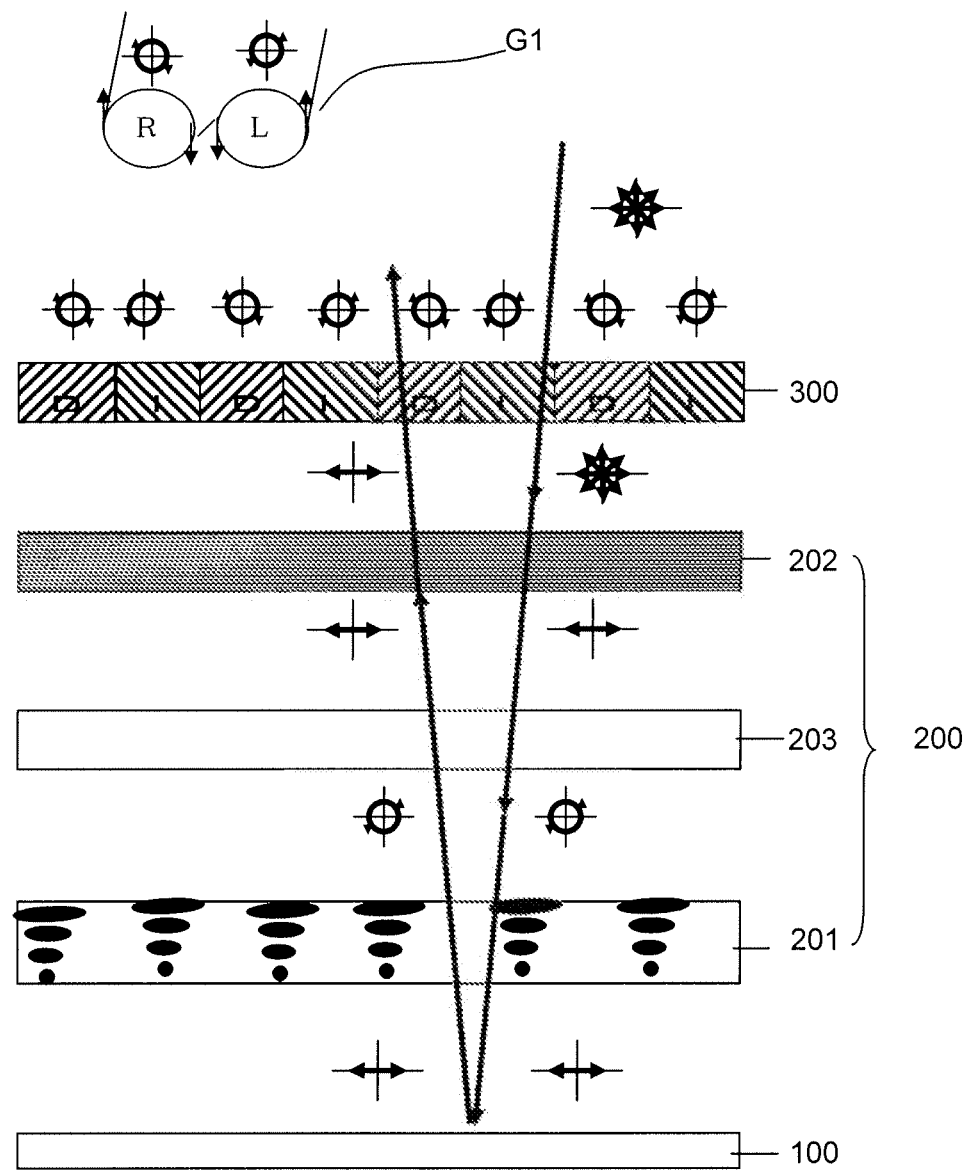

Hereinafter, a operating principle of the 3D display device 3A shown in FIG. 7 will be described with reference to FIGS. 11 and 12, wherein FIG. 11 shows the operating principle of the 3D display device 3A in the dark state, and FIG. 12 shows the operating principle of the 3D display device 3A in the bright state.

As shown in FIG. 11, when the 3D display device 3A is in dark state, the display panel 201 is powered on. As shown in FIG. 11, liquid crystal molecules of the display panel 201 vertically align along a direction of a electric field, so as not to change a polarization direction of passing light. At this time, the linearly polarized light emitted from the polarizer 202 (denoted by a double arrow) becomes circularly polarized light, such as left-handed circularly polarized light (denoted by a anti-clockwise circle), after passing through the λ/4 wave plate 203. The polarization direction thereof is not changed after the light is transmitted through the display panel 201, and then the light is converted into right-handed circularly polarized light (denoted by a clockwise circle) after being reflected by the reflecting unit 100 and then transmitted through the display panel 201 as it is, and then, is converted into linearly polarized light (denoted by a point circle) after passing the λ/4 wave plate 203. The linearly polarized light has a polarization direction perpendicular to the transmission axis direction of the polarizer 202, and thus is completely absorbed by the polarizer 202 and can not be transmitted through, and the 3D display device 3A appears in the dark state.

When the 3D display device 3A is in the bright state, the display panel 201 is not powered on, the liquid crystal molecules of the display panel 201 has optical rotation effect on passing light. As shown in FIG. 12, a nematic phase liquid crystal substance with a structure in which a directional vector is twisted by 90° may have a optical rotation property and also have a residual birefringence, thus can perform a conversion between linearly polarized light and circularly polarized light. The linearly polarized light transmitted through the polarizer 202 (denoted by a double arrow) becomes circularly polarized light, such as left-handed circularly polarized light (denoted by a anti-clockwise circle), after passing the λ/4 wave plate 203. The circularly polarized light is converted into linearly polarized light (denoted by a double arrow) after passing the display panel 201. The linearly polarized light still is linearly polarized light (denoted by a double arrow) after passing the reflecting unit 100 and is rechanged into circularly polarized light, such as, the left-handed circularly polarized light (denoted by a anti-clockwise circle) after passing the display panel 201. It becomes linearly polarized light (denoted by a double arrow) after passing the λ/4 wave plate 203, and a polarization direction of the linearly polarized light is parallel to the transmission axis direction of the polarizer 202, thus being transmitted completely. Finally, it passes the phase retarder plate 300 and is converted into left-handed circularly polarized light (denoted by a anti-clockwise circle) and right-handed circularly polarized light (denoted by a clockwise circle), or is converted into two sets of linearly polarized light with polarization directions perpendicular to each other, corresponding to left and right eyes, respectively, and then, respectively enters the left and right eyes after passing the circularly polarized light glasses or linearly polarized light glasses, displaying a 3D image.

The display panel 201 of the embodiment has a structure identical with that of the display panel 201 according to the first embodiment of the present invention, which will not be described here. The operation mode of the display panel 201 of the present embodiment is different from that of the first embodiment of the present invention, thereby the operation processes of them are different.

A Fourth Embodiment

Figure 8:
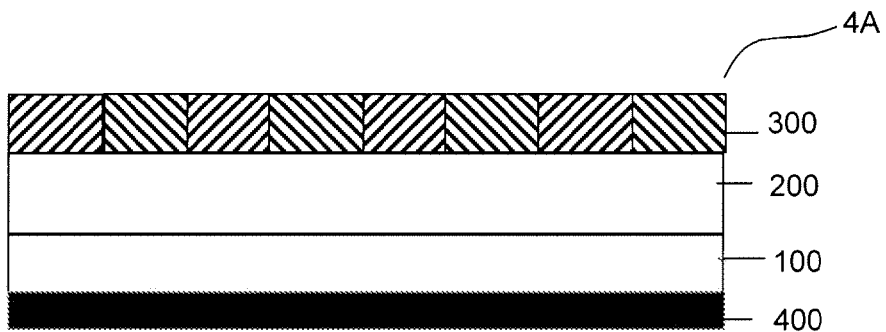
FIG. 8 is a schematic cross-sectional structural view of a 3D display device according to a fourth embodiment of the present invention.

FIG. 8 shows a 3D display device 4A according to a fourth embodiment of the present invention. The 3D display device 4A differs from the 3D display device 1A according to the first embodiment of the present invention only in the polarization display unit 200, and other components and structures thereof are basically the same as the 3D display device 1A or the 3D display device 2A.

Exemplarily, as shown in FIG. 8, the polarization display unit 200 is a dichroic liquid crystal display panel, and when being powered on, the dichroic liquid crystal display panel transmits two types of linearly polarized light with polarization directions perpendicular to each other, and when not being powered on, the dichroic liquid crystal display panel only transmits one type of polarized light of the two types of linearly polarized light with polarization directions perpendicular to each other and absorbs another polarized light.

Exemplarily, a dichroic dye is added into liquid crystal material of the dichroic display panel 200. While the dichroic display panel is not powered on, the dichroic dye only selectively absorbs one of two incident orthogonal linearly polarized light while allow the other to be transmitted through. Liquid crystal molecules have initial orientations parallel to each other which are parallel or perpendicular to polarization direction of incident polarized light of the liquid crystal cell.

As for incident natural light, light component having polarization direction parallel to a directional vector of the liquid crystal molecules is absorbed, while another light component is transmitted through. When the dichroic liquid crystal display panel is powered on, both the liquid crystal molecules and the dichroic dye molecules align along a direction of an electric field, and thus, the two types of polarized light with polarization directions perpendicular to each other can both be transmitted through.

The reflecting unit according to the present embodiment is a selective reflecting unit 100 with a structure identical with that of the reflecting unit of the 3D display device 1A according to the first embodiment of the present invention or the reflecting unit of the 3D display device 2A according to the second embodiment of the present invention, which only selectively reflects polarized light having one polarization direction. When the 3D display device 4A is in the dark state, the polarization display unit 200 is not powered on, and only polarized light having one polarization direction is allowed to transmit through, which can not be reflected by the reflecting unit 100, thereby the 3D display device 4A appears the dark state. When the 3D display device 4A is in the bright state, the polarization display unit 200 is powered on, two polarized light with polarization directions perpendicular to each other are allowed to transmit through, wherein one is reflected by the reflecting unit 100 and the other is absorbed, thereby the 3D display device 4A appears the bright state.

An embodiment of the present invention further provides a 3D display system, comprising: the 3D display device according to any one embodiment of the present invention and a polarized glasses, wherein the polarized glasses may be a linearly polarized light glasses or a circularly polarized light glasses, wherein the type of the polarized glasses may be selected depending on the polarized light emitted from the 3D display device so as to be matched to the 3D display device. For example, FIGS. 11 and 12 show a circularly polarized light glasses G1.

The 3D display device according to embodiments of the present invention may be applied to a device, such as, a liquid crystal display, a liquid crystal television, a mobile phone or a palmtop.

To sum up, embodiments of the present invention disclose a 3D display device and a 3D display system. Without a backlight source, the 3D display effect can be realized under the ambient light, and therefore, the 3D display device has a simple structure, a reduced cost, and can facilitate development of the 3D display technology.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A 3D display device, comprising:
a reflecting unit, reflecting light incident thereon;
a polarization display unit, formed at a reflected light emitting side of the reflecting unit, and the polarization display unit for displaying images, converting incident natural light into polarized light and transmitting or blocking light reflected by the reflecting unit; and
a polarization direction adjustment unit, formed at a reflected light emitting side of the polarization display unit, for converting the reflected light emitted from the polarization display unit into two sets of polarized light with different polarization directions, wherein the polarization display unit is a liquid crystal display panel, the polarization display unit displays an using by using the incident natural light, the 3D display device does not comprise any backlight source.

2. The 3D display device according to claim 1, wherein the reflecting unit is a total reflecting unit which totally reflects light incident thereon.

3. The 3D display device according to claim 2, wherein the polarization display unit comprises:
the liquid crystal display panel, disposed at a reflected light emitting side of the total reflecting unit, displaying images, converting linearly polarized light into circularly polarized light or converting circularly polarized light into linearly polarized light when the liquid crystal display panel rotates incoming light;
a $\lambda/4$ wave plate, disposed at a reflected light emitting side of the liquid crystal display panel; and
a polarizer, disposed at a reflected light emitting side of the $\lambda/4$ wave plate.

4. The 3D display device according to claim 3, wherein the polarizer is configured to transmit polarized light with polarization direction parallel to a transmission axis direction thereof while absorb polarized light with polarization direction perpendicular to the transmission axis direction.

5. The 3D display device according to claim 3, wherein the liquid crystal display panel is a TN type liquid crystal display panel, a VA type liquid crystal display panel, an IPS type liquid crystal display panel or a FFS type liquid crystal display panel.

6. The 3D display device according to claim 1, wherein the reflecting unit is a selective reflecting unit which reflects only polarized light with one polarization direction.

7. The 3D display device according to claim 6, wherein the selective reflecting unit comprises: a cholesterol liquid crystal layer with planar texture, only reflecting left-handed or right-handed circularly polarized light; and a $\lambda/4$ wave plate, formed at a reflected light emitting side of the cholesterol liquid crystal layer, converting the left-handed or right-handed circularly polarized light emitted from the cholesterol liquid crystal layer into linearly polarized light.

8. The 3D display device according to claim 6, wherein the selective reflecting unit comprises: a substrate; and a plurality of metal strips parallel to each other, formed on the substrate.

9. The 3D display device according to claim 8, wherein the polarization display unit comprises: the liquid crystal display panel for displaying images; and a polarizer, formed at a reflected light emitting side of the liquid crystal display panel, a extending direction of each of the plurality of metal strips is parallel or perpendicular to a transmission axis direction of the polarizer.

10. The 3D display device according to claim 8, wherein the plurality of metal strips are formed by using a nanometer-level wire grid polarizer technology.

11. The 3D display device according to claim 6, wherein the polarization display unit comprises:
the liquid crystal display panel, displaying images; and
a polarizer, formed at a reflected light emitting side of the liquid crystal display panel.

12. The 3D display device according to claim 11, wherein the liquid crystal display panel is a TN type liquid crystal display panel, a VA type liquid crystal display panel, an IPS type liquid crystal display panel or a FFS type liquid crystal display panel.

13. The 3D display device according to claim 6, wherein the polarization display unit is a dichroic liquid crystal display panel, and when being powered on, the dichroic liquid crystal display panel transmits two types of linearly polarized light with polarization directions perpendicular to each other, and when not being powered on, the dichroic liquid crystal display panel only transmits one type of polarized light of the two types of linearly polarized light with polarization directions perpendicular to each other and absorbs another polarized light.

14. The 3D display device according to claim 6, further comprising:
an absorption unit, disposed at a side opposite to the polarization display unit of the selective reflecting unit, and the absorption unit for absorbing light transmitted through the selective reflecting unit.

15. The 3D display device according to claim 1, wherein the polarization direction adjustment unit comprises:
a liquid crystal cell, for converting polarized light emitted from the polarization display unit into two sets of polarized light alternating temporally or spatially, the two sets of polarized light having polarization directions perpendicular to each other;
a $\lambda/4$ wave plate, formed on a reflected light emitting side of the liquid crystal cell, converting the two sets of polarized light with polarization directions perpendicular to each other into left-handed and right-handed circularly polarized light, respectively.

16. The 3D display device according to claim 1, wherein the polarization direction adjustment unit is a phase retarder plate, and the phase retarder plate comprises a plurality of strip-shaped regions with equal width disposed horizontally or vertically, every two adjacent strip-shaped regions having phase delay difference of $\lambda/2$.

17. The 3D display device according to claim 16, wherein one strip-shaped region of the two adjacent strip-shaped regions has a phase delay of $\lambda/4$, and the other one has a phase delay of $-\lambda/4$.

18. The 3D display device according to claim 16, wherein one strip-shaped region of the two adjacent strip-shaped regions has a phase delay of $\lambda/2$, and the other one has a phase delay of 0.

19. A 3D display system, comprising:
a 3D display device according to claim 1; and
a 3D polarized glasses, used together with the 3D display device.

20. The 3D display system according to claim 19, wherein the 3D polarized glasses is a linearly polarized light glasses or a circularly polarized light glasses.

* * * * *